(12) United States Patent
Welch et al.

(10) Patent No.: US 12,542,720 B2
(45) Date of Patent: *Feb. 3, 2026

(54) TICKET-BASED PROVISIONING OF CLOUD INFRASTRUCTURE FOR A SAAS PROVIDER

(71) Applicant: HashiCorp, San Francisco, CA (US)

(72) Inventors: Paul Welch, Washington, DC (US); Kim Ngo, Fort Worth, TX (US); Justin Campbell, West Chester, PA (US); Greg Hoin, Annecy (FR); Lauren Rother, Durnham, NC (US)

(73) Assignee: International Business Machines Corporation, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 18/594,404

(22) Filed: Mar. 4, 2024

(65) Prior Publication Data
US 2024/0205110 A1 Jun. 20, 2024

Related U.S. Application Data

(63) Continuation of application No. 17/888,204, filed on Aug. 15, 2022, now Pat. No. 11,924,066, which is a
(Continued)

(51) Int. Cl.
*H04L 41/5041* (2022.01)
*H04L 67/10* (2022.01)
(Continued)

(52) U.S. Cl.
CPC .......... *H04L 41/5045* (2013.01); *H04L 67/10* (2013.01); *H04L 67/1097* (2013.01); *H04L 41/0894* (2022.05)

(58) Field of Classification Search
CPC . H04L 41/5045; H04L 67/10; H04L 67/1097; H04L 41/0894; H04L 41/0843;
(Continued)

(56) References Cited

U.S. PATENT DOCUMENTS 9,282,166 B2 * 3/2016 Markley ................. H04L 67/10
10,075,442 B2 * 9/2018 Simpson ............... G06F 16/144
(Continued)

*Primary Examiner* — Michael Won
(74) *Attorney, Agent, or Firm* — CANTOR COLBURN LLP; Rakesh Roy

(57) ABSTRACT

Systems and methods for ticket-based provisioning of cloud infrastructure from one or more cloud providers to build one or more computing workspaces of an enterprise. A provisioning platform provides a module catalog having one or more infrastructure-as-code (IAC) modules, each including code that is executable to provision cloud computing resources for the cloud infrastructure from the cloud providers to build the computing workspaces of the enterprise. A service catalog has one or more electronic entries mapped to and corresponding with the IAC modules of the module catalog. The service catalog receives one or more tickets that each specify at least one of the electronic entries in the service catalog, to bind each specified electronic entry with a corresponding LAC module, causing the provisioning platform to instantiate on the more cloud providers the computing resources for the cloud infrastructure corresponding to the ticket.

3 Claims, 4 Drawing Sheets

Related U.S. Application Data continuation of application No. 17/306,845, filed on May 3, 2021, now Pat. No. 11,418,415, which is a continuation of application No. 16/875,224, filed on May 15, 2020, now Pat. No. 10,999,162.

(51) Int. Cl.
*H04L 67/1097* (2022.01)
*H04L 41/0894* (2022.01)

(58) Field of Classification Search
CPC ............ H04L 41/0859; H04L 41/5019; H04L 41/5096
See application file for complete search history.

(56) References Cited

U.S. PATENT DOCUMENTS

| | | | |
|---|---|---|---|
| 10,380,558 B2 * | 8/2019 | Vukovic | G06N 20/00 |
| 10,872,029 B1 | 12/2020 | Bawcom | |
| 10,884,732 B1 * | 1/2021 | Zolotow | G06F 8/76 |
| 10,999,162 B1 * | 5/2021 | Welch | H04L 67/1097 |
| 11,129,159 B2 | 9/2021 | Madapoosi et al. | |
| 11,349,923 B2 * | 5/2022 | Cook | H04L 47/803 |
| 11,418,415 B2 | 8/2022 | Welch et al. | |
| 12,267,345 B1 * | 4/2025 | Erlingsson | G06F 9/5072 |
| 2012/0072555 A1 | 3/2012 | Deluca et al. | |
| 2014/0282037 A1 | 9/2014 | Narasimhan et al. | |
| 2015/0058459 A1 | 2/2015 | Amendjian et al. | |
| 2015/0341230 A1 | 11/2015 | Dave et al. | |
| 2016/0019636 A1 | 1/2016 | Adapalli et al. | |
| 2016/0092339 A1 | 3/2016 | Straub et al. | |
| 2017/0026416 A1 | 1/2017 | Carpenter et al. | |
| 2017/0046235 A1 | 2/2017 | Straub et al. | |
| 2017/0048252 A1 | 2/2017 | Straub et al. | |
| 2017/0134246 A1 | 5/2017 | Amendjian et al. | |
| 2017/0244593 A1 | 8/2017 | Rangasamy et al. | |
| 2018/0287898 A1 | 10/2018 | Bellini et al. | |
| 2019/0171966 A1 | 6/2019 | Rangasamy | |
| 2019/0342160 A1 | 11/2019 | Baddepudi et al. | |
| 2020/0278920 A1 | 9/2020 | Khakare et al. | |
| 2020/0329464 A1 | 10/2020 | Madapoosi Sampath et al. | |
| 2020/0387357 A1 | 12/2020 | Mathon et al. | |
| 2021/0392039 A1 | 12/2021 | Atur et al. | |
| 2022/0337578 A1 | 10/2022 | Mankekar et al. | |
| 2023/0229625 A1 | 7/2023 | Nerurkar | |

* cited by examiner

TICKET-BASED PROVISIONING OF CLOUD INFRASTRUCTURE FOR A SAAS PROVIDER

CROSS-REFERENCES TO RELATED APPLICATIONS

This application is a continuation of U.S. application Ser. No. 17/306,845 entitled "TICKET-BASED PROVISIONING OF CLOUD INFRASTRUCTURE FOR A SAAS PROVIDER," and filed on May 3, 2021, which is a continuation of application Ser. No. 16/875,224 entitled "TICKET-BASED PROVISIONING OF CLOUD INFRASTRUCTURE FOR A SAAS PROVIDER," filed on May 15, 2020, and issued on May 4, 2021 as U.S. Pat. No. 10,999,162, the entirety of each which are hereby incorporated by reference herein.

TECHNICAL FIELD

The subject matter described herein relates to information technology (IT) infrastructure, and more particularly to ticket-based provisioning of cloud infrastructure for a software-as-a-service (SaaS) provider.

BACKGROUND

Some enterprise cloud computing (ECC) companies employ digital workflow management, which is sometimes referred to as "service management." Some of these companies employ vast, customizable workflow products spanning information technology (IT), operations, compliance and security (OCS), human resources (HR) and customer service (CS).

The vast range of offerings provides a compelling solution to the pain large companies face managing the interactions between many different teams, particularly when some teams may be very large (1,000+) and serviced by teams that are much smaller (~10). These ECC companies provide tools to allow a company to define workflows for all kinds of interactions between teams and interweave applicable policies, including avenues for exceptions, into those workflows. This start-to-finish solution, which includes as much of the execution as possible, also gives management and executives oversight and control in a manageable, digestible way. How a company implements these workflow platforms depends on the size of the company, and the scope of its polices, processes and procedures.

One of the biggest benefits of ECC using digital workflow management is enabling teams to remain focused solely on their area of responsibility. Developers of an application, or "app," do not need to know how to provision or maintain cloud computing environments, which in many cases would also require them to know their organization's policies about such environments. Further, organization management generally prefers to have as few hands on these critical systems as possible.

Consumers (developers and other employees who need infrastructure to do their work) need to be able to request and receive infrastructure through established workflows and workflow tools. Producers (Infrastructure/IT/Ops teams) need to be able to use an infrastructure provisioning platform to set up infrastructure as code while still fulfilling the requests of the consumers through the established workflows and workflow tools.

Infrastructure refers to the hardware resources, software resources, and/or network resources forming an enterprise's IT environment. For example, hardware resources may include servers, computers, data centers, switches, hubs, routers, and/or the like. Meanwhile, software resources may include the digital workflow management software applications, productivity software applications, and/or the like. The network resources of the enterprise's information technology infrastructure may include any resources providing network enablement, network connectivity, network security, and/or the like.

The information technology infrastructure of the enterprise may enable the delivery of information technology services and/or solutions to a variety of teams of internal and external users including, for example, employees, partners, customers, and/or the like. For instance, the hardware resources of the enterprise's information technology infrastructure may be used to host the software resources. At least some of the software resources within the enterprise's information technology infrastructure may be available remotely, for example, as SaaS, a web application, and/or the like. Remote access to these software resources may be enabled and/or regulated by the network resources within the enterprise's information technology infrastructure.

ECC companies fall short at actually building cloud infrastructure in a repeatable, versioned way. What is needed is a system and method providing companies the power and flexibility of a DevOps workflow of cloud infrastructure provisioning, as well as provide an easy way for app developers (who are not concerned with infrastructure as code) to make requests for services of a workflow.

SUMMARY

This document describes ticket-based provisioning of cloud infrastructure for an enterprise, using one or more tickets provided to a service catalog provided by an information technology service management system associated with the enterprise. In the past, organizational processes designed around manual actions and ticketing are not conducive to more dynamic cloud-based infrastructure provisioning and deployment. The presently described systems and methods bridge that gap by preserving the interface of a ticket driven system, while automating the processing of cloud provisioning using infrastructure as code (IaC).

In one aspect, systems for ticket-based provisioning of cloud infrastructure from one or more cloud providers to build one or more computing workspaces of an enterprise are described. In some implementations, a system includes a provisioning platform that provides a module catalog. The module catalog has one or more infrastructure-as-code (IAC) modules, each including code that is executable to provision cloud computing resources for the cloud infrastructure from the one or more cloud providers to build the one or more computing workspaces of the enterprise. The system further includes a service catalog having one or more electronic entries mapped to and corresponding with the one or more IAC modules of the module catalog. The service catalog is configured to receive one or more tickets that each specify at least one of the one or more electronic entries in the service catalog, and to bind the specified at least one electronic entry with a corresponding at least one of the one or more IAC modules in the module catalog. The binding causes the provisioning platform to instantiate on the one or more cloud providers the computing resources for the cloud infrastructure corresponding to the ticket.

In another aspect, methods of ticket-based provisioning of cloud infrastructure from one or more cloud providers to build one or more computing workspaces of an enterprise are described. In some implementations, a method includes providing, by a provisioning platform, a module catalog, the module catalog having one or more infrastructure-as-code (IAC) modules. Each of the one or more IAC modules includes code that is executable to provision cloud computing resources for the cloud infrastructure from the one or more cloud providers to build the one or more computing workspaces of the enterprise. The method further includes generating a service catalog having one or more electronic entries mapped to and corresponding with the one or more IAC modules of the module catalog. The service catalog is configured to receive one or more tickets that each specify at least one of the one or more electronic entries in the service catalog. The method further includes receiving, by the service catalog, at least one specified electronic entry by at least one of the one or more tickets. The method further includes binding, by the service catalog, the at least one specified electronic entry with a corresponding at least one of the one or more IAC modules in the module catalog, and instantiating, by the provisioning platform on the one or more cloud providers based on the binding, the computing resources for the cloud infrastructure corresponding to the ticket.

In yet another aspect, computer program products for ticket-based provisioning of cloud infrastructure from one or more cloud providers to build one or more computing workspaces of an enterprise are described. In some implementations, a computer program product comprises a non-transitory machine-readable medium storing instructions that, when executed by at least one programmable processor, cause the at least one programmable processor to perform operations to provide a module catalog having one or more infrastructure-as-code (IAC) modules. Each of the one or more IAC modules includes code that is executable to provision cloud computing resources for the cloud infrastructure from the one or more cloud providers to build the one or more computing workspaces of the enterprise. The operations further include an operation to generate a service catalog having one or more electronic entries mapped to and corresponding with the one or more IAC modules of the module catalog. The service catalog is configured to receive one or more tickets that each specify at least one of the one or more electronic entries in the service catalog. The operations further include operations to provide, to the service catalog, at least one specified electronic entry by at least one of the one or more tickets, and to bind the at least one specified electronic entry with a corresponding at least one of the one or more IAC modules in the module catalog. The operations further include an operation to instantiate, on the one or more cloud providers based on the binding, the computing resources for the cloud infrastructure corresponding to the ticket.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to ticket-based provisioning of cloud infrastructure, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

This document describes a system and method for provisioning cloud infrastructure for digital workflow management, where requests and approvals for hardware, software and services are typically made via "tickets" that are created, tracked and managed. Typically, workflow services are requested from a service catalog provided by the service management provider company.

Configuration of the enterprise's IT infrastructure may include provisioning, modifying, and/or do-provisioning private resources and/or public resources to support the operations of the software application. Moreover, the enterprise's information technology infrastructure may require continuous monitoring and/or updates in order to ensure that the performance of the software application meets a threshold metric such as, for example, a service level objective (SLO) and/or the like.

Figure 1A:
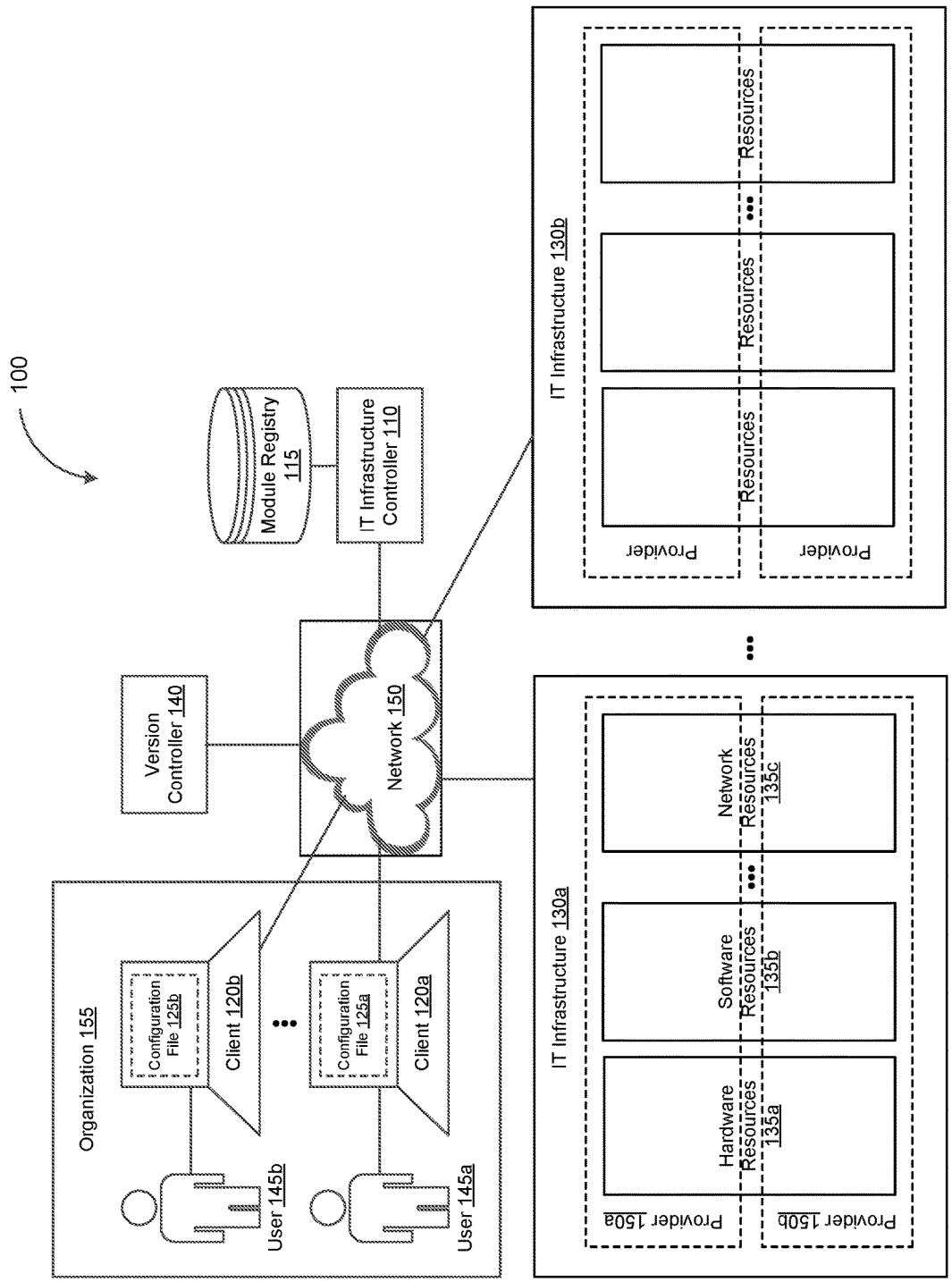
FIG. 1A depicts a system diagram illustrating an information technology infrastructure management system, in accordance with some example embodiments.

FIG. 1A depicts a system diagram illustrating an information technology (IT) infrastructure management system 100, in accordance with some example embodiments. Referring to FIG. 1A, the information technology infrastructure management system 100 may include an information technology infrastructure controller 110, a first client 120*a*, a second client 120*b*, an information technology infrastructure 130, and a version controller 140. As FIG. 1A shows, the information technology infrastructure controller 110, the first client 120a, the second client 120b, the information technology infrastructure 130, and/or the version controller 140 may be communicatively coupled via a network 150. The network 150 may be any wired and/or wireless network including, for example, a local area network (LAN), a wide area network (WAN), a public land mobile network (PLMN), the Internet, and/or the like.

Referring again to FIG. 1A, the information technology infrastructure 130 may include a plurality of resources including, for example, hardware resources 135a, software resources 135b, network resources 135c, and/or the like. It should be appreciated that the information technology infrastructure 130 may include physical equipment and/or virtual machines. Moreover, FIG. 1A shows that the information technology infrastructure 130 may include resources from multiple providers including, for example, a first provider 150a, a second provider 150b, and/or the like. For example, at least one of the first provider 150a and the second provider 150b may be a private provider such that at least a portion of the hardware resources 135a, the software resources 135b, and/or the network resources 135c are private resources owned and operated by an enterprise for exclusive use by the enterprise. Alternatively and/or additionally, at least one of the first provider 150a and/or the second provider 150b may be a third party provider including, for example, an infrastructure-as-a-service (IaaS) provider, a platform-as-a-service (PaaS) provider, a software-as-a-service (SaaS) provider, and/or the like. As such, at least a portion of the hardware resources 135a, the software resources 135b, and/or the network resources 135c may be public resources shared amongst multiple enterprises.

In some example embodiments, the information technology infrastructure controller 110 may be configured to provide lifecycle management for the information technology infrastructure 130. For example, the information technology infrastructure controller 110 may provide lifecycle management for the information technology infrastructure 130 by at least managing the provisioning, modifying, and/or de-provisioning of one or more of the hardware resources 135a, the software resources 135b, and the network resources 135c. The provisioning, modifying, and/or de-provisioning of one or more of the hardware resources 135a, the software resources 135b, and the network resources 135c may be engendered by the deployment, testing, and/or maintenance of a software application. For example, one or more of the hardware resources 135a, the software resources 135b, and the network resources 135c may be provisioned, modified, and/or de-provisioned as part of configuring the information technology infrastructure 130 to host the software application and/or to ensure that the performance of the software application meets a threshold metric (e.g., a service level objective (SLO) and/or the like). However, it should be appreciated that the information technology infrastructure 130 may be configured and/or reconfigured to achieve any information technology objective including, for example, support for multi-tier software applications, self-service clusters, software demonstrations, disposable environments (e.g., production environments, staging environments, and/or the like), software defined networking, resource schedulers, multi-cloud deployment, and/or the like.

In some example embodiments, at least a portion of the information technology infrastructure 130 may be configured using infrastructure as code (IaC). That is, instead of and/or in addition to physical hardware configuration, the information technology infrastructure 130 may be configured via software using, for example, one or more configuration files specifying the configurations to apply to the information technology infrastructure 130 as well as one or more corresponding variables. For instance, in order to support the deployment, testing, and/or maintenance of the software application, the information technology infrastructure 130 may be configured based on a first configuration file 125a and/or a second configuration file 125b created respectively, for example, by a first user 145a at the first client 120a and a second user 145b at the second client 120b. As shown in FIG. 1A, the first user 145a at the first client 120a and the second user 145b at the second client 120b may be associated with a same organization, for example, an organization 155. However, it should be appreciated that the first user 145a at the first client 120a and the second user 145b at the second client 120b may be associated with different organizations.

The first configuration file 125a and the second configuration file 125b may each include a programming code-based representation of the hardware resources 135a, the software resources 135b, and/or the network resources 135c in the information technology infrastructure 130. For example, the first configuration file 125a and/or the second configuration file 125b may be rendered in a configuration language (e.g., HashiCorp Configuration Language (HCL) provided by HashiCorp, San Francisco, CA) and/or a data interchange language (e.g., JavaScript Object Notation (JSON)) that is human readable and editable as well as machine readable. Moreover, the first configuration file 125a and/or the second configuration file 125b may specify one or more configurations to apply to the information technology infrastructure 130 including, for example, the provisioning, modification, and/or de-provisioning of the hardware resources 135a, the software resources 135b, and/or the network resources 135c.

In some example embodiments, the information technology infrastructure controller 110 may be configured to generate, based at least on the first configuration file 125a and/or the second configuration file 125b, an execution plan for applying, to the information technology infrastructure 130, the one or more configurations specified in the first configuration file 125a and/or the second configuration file 125b. For example, the first configuration file 125a and/or the second configuration file 125b may be sent to the version controller 140 before being transferred to the information technology infrastructure controller 110. The version controller 140 may be configured to manage and/or reconcile different versions of the first configuration file 125a and/or the second configuration file 125b. It should be appreciated that the version controller 140 may be any version control system, revision control system, and/or source control system capable of tracking and managing changes made to a configuration file by one or more users. For instance, the version controller 140 may be Github, Github Enterprise, GitLab, GitLab EE and CE, Bitbucket Cloud, Bitbucket Server, and/or the like. Alternatively and/or additionally, the version controller 140 may be the private and/or proprietary version control system implemented for exclusive use by an enterprise.

Figure 1B:
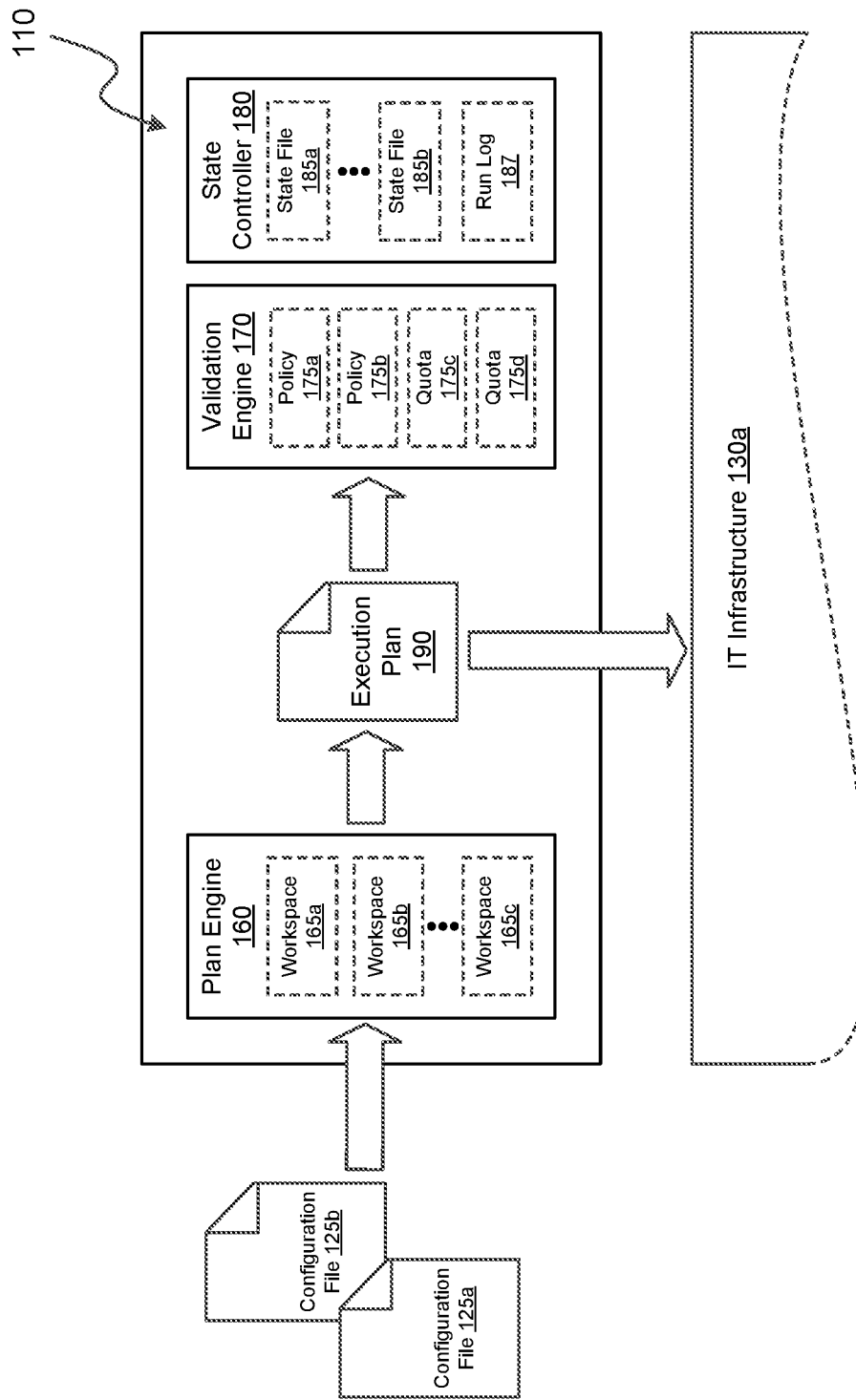
FIG. 1B depicts a block diagram illustrating an information technology infrastructure controller, in accordance with some example embodiments.

FIG. 1B depicts a block diagram illustrating the information technology infrastructure controller 110, in accordance with some example embodiments. Referring to FIGS. 1A-B, the information technology infrastructure controller 110 may comprise a plan engine 160, a validation engine 170, and a state controller 180. As shown in FIG. 1B, in some example embodiments, the information technology infrastructure controller 110 may be configured to generate an execution plan 190 for applying, to the information technology infrastructure 130, one or more configurations specified, for example, in the first configuration file 125*a* and/or the second configuration file 125*b*.

Referring again to FIG. 11, the plan engine 160 may include one or more workspaces including, for example, a first workspace 165*a*, a second workspace 165*b*, and a third workspace 165*c*. Each of the first workspace 165*a*, the second workspace 165*b*, and the third workspace 165*c* may be configured to maintain the configurations for at least a portion of the information technology infrastructure 130. When the first configuration file 125*a* and/or the second configuration filed 125*b* are pushed and/or pulled from the version controller 140, the plan engine 160 may merge the first configuration file 125*a* and/or the second configuration file 125*b* into the first workspace 165*a*, the second workspace 165*b*, and/or the third workspace 165*c*.

In some example embodiments, the first workspace 165*a*, the second workspace 165*b*, and the third workspace 165*c* may each maintain a different iteration of configurations for at least a portion of the information technology infrastructure 130. For example, the first workspace 165*a*, the second workspace 165*b*, and the third workspace 165*c* may each maintain the configurations that are applied to the information technology infrastructure 130 in order to configure the information technology infrastructure 130 to support a production environment, a staging environment, and a development environment for a software application. Accordingly, the first workspace 165*a* may maintain the configurations associated with a production environment, the second workspace 165*b* may maintain the configurations associated with a staging environment, and the third workspace 165*c* may maintain the configurations associated with a development environment.

Alternatively and/or additionally, each of the first workspace 165*a*, the second workspace 165*b*, and the third workspace 165*c* may be associated with the configurations for a specific portion the information technology infrastructure 130. For examples, the first workspace 165*a* may maintain the configurations for the hardware resources 135*a* of the information technology infrastructure 130, the second workspace 165*b* may maintain the configurations for the software resources 135*b* of the information technology infrastructure 130, and the third workspace 165*c* may maintain the configurations for the network resources 135*c* of the information technology infrastructure 130.

In some example embodiments, the first workspace 165*a*, the second workspace 165*b*, and the third workspace 165*c* may each be associated with a different set of variables. Each set of variables may correspond to a different iteration of configurations for the information technology infrastructure 130 (e.g., production environment, staging environment, development environment, and/or the like). Alternatively and/or additionally, each set of variables may correspond to the configurations for a different portion of the information technology infrastructure 130 (e.g., the hardware resources 135*a*, the software resources 135*b*, the network resources 135*c*, and/or the like). At least some of these variables may be set and/or modified by merging the first configuration file 125*a* and/or the second configuration file 125*b* into the first workspace 165*a*, the second workspace 165*b*, and the third workspace 165*c*.

The first workspace 165*a*, the second workspace 165*b*, and the third workspace 165*c* may be associated with the organization 155. Moreover, the first workspace 165*a*, the second workspace 165*b*, and the third workspace 165*c* may each be associated with a team of one or more users from the organization 155. For example, the first workspace 165*a* may be associated with a first team of users that includes the first user 145*a* at the first client 120*a* while the second workspace 165*b* may be associated with a second team of users that includes the second user 145*b* at the second client 120*b*. Each team of users may be accorded exclusive access to the corresponding workspace. Moreover, different users within a team of users may afforded different access privileges with respect to a corresponding workspace. For example, the first user 145*a* may be provided read access, write access, and/or administrative access to the first workspace 165*a* while the second user 145*b* may be provided read access, write access, and/or administrative access to the second workspace 165*b*. However, the first user 145*a* may be prevented from accessing the second workspace 165*b* if the first user 145*a* is not a member of the second team of users having exclusive access to the second workspace 165*b*. Likewise, the second user 145*b* may be prevented from accessing the first workspace 165*a* if the second user 145*b* is not a member of the first team of users having exclusive access to the first workspace 165*a*.

In some example embodiments, the first user 145*a* may access the first workspace 165*a* by at least merging the first configuration file 125*a* into the first workspace 165*a*. For example, the information technology infrastructure controller 110 may register, at the version controller 140, a webhook. The webhook may be a hypertext transfer protocol (HTTP) callback configured to post, to the information technology infrastructure controller 110, a notification when the first user 145*a* commits the first configuration file 125*a* at the version controller 140. Meanwhile, the information technology infrastructure controller 110 may respond to the notification by at least pulling the first configuration file 125*a* from the version controller 140 and merging the first configuration file 125*a* into the first workspace 165*a*. As noted, merging the first configuration file 125*a* into the first workspace 165*a* may set and/or modify at least some of the variables associated with the first workspace 165*a*. Moreover, by merging the first configuration file 125*a* into the first workspace 165*a*, the first user 145*a* may modify the configurations specified for at least a portion of the information technology infrastructure 130. For instance, merging the first configuration file 125*a* into the first workspace 165*a* may modify the configurations specified for the hardware resources 135*a* of the information technology infrastructure 130 in order to provide a production environment for a software application.

Alternatively and/or additionally, the second user 145*b* may access the second workspace 165*b* by at least merging the second configuration file 125*b* into the second workspace 165*b*. The information technology infrastructure controller 110 may pull, from the version controller 140, the second configuration file 125*b* in response to a notification from the webhook at the version controller 140. Merging the second configuration file 125*b* into the second workspace 165*b* may modify the configurations specified for at least a portion of the information technology infrastructure 130 by at least setting and/or modifying at least some of the variables associated with the second workspace 165*b*. For example, merging the second configuration file 125*b* into the second workspace 165*b* may modify the configurations specified for the software resources 135*b* of the information technology infrastructure 130 in order to provide a staging environment for a software application.

The information technology infrastructure controller 110 may generate, based at least on the configurations associated with the first workspace 165a, the second workspace 165b, and/or the third workspace 165c, the execution plan 190. The execution plan 190 may include one or more operations to provision, modify, and/or de-provision resources at the information technology infrastructure 130 in order to apply, to the information technology infrastructure 130, the configurations associated with the first workspace 165a, the second workspace 165b, and/or the third workspace 165c.

In some example embodiments, the information technology infrastructure controller 110 may generate the execution plan 190 by at least consolidating the configurations associated with the first workspace 165a, the second workspace 165b, and the third workspace 165c. That is, the execution plan 190 may be generated to achieve a combination of the different iterations of the configurations for the information technology infrastructure 130 and/or the configurations for different portions of the information technology infrastructure 130. Alternatively and/or additionally, the information technology infrastructure controller 110 may generate the execution plan 190 based on some but not all of the configurations associated with the first workspace 165a, the second workspace 165b, and/or the third workspace 165c. For example, the execution plan 190 may be generated to achieve only some iterations of the configurations for the information technology infrastructure 130 and/or the configurations for only a portion of the information technology infrastructure 130.

The information technology infrastructure controller 110 may generate the execution plan 190, including by creating a corresponding dependency graph (e.g., a directed acyclic graph (DAG) and/or the like) having a plurality of nodes, at least some of which are interconnected by one or more directed edges.

To apply the configurations associated with the execution plan 190 to the information technology infrastructure 130, the information technology infrastructure controller 110 may traverse the corresponding dependency graph. For instance, the information technology infrastructure controller 110 may perform a depth-first traversal of the dependency graph in order to determine the resources that the execution plan 190 indicates as requiring provisioning, modification, and/or de-provisioning. The information technology infrastructure controller 110 may further identify, based on the dependency graph, independent resources that may be provisioned, modified, and/or de-provisioned in parallel. It should be appreciated that the information technology infrastructure controller 110 may be configured to maximize parallelization when applying, to the information technology infrastructure 130, the configurations associated with the execution plan 190.

The information technology infrastructure controller 110 may generate the dependency graph by at least adding, to the dependency graph, one or more resource nodes corresponding to individual resources including, for example, one or more hardware resources 135a, software resources 135b, network resources 135c, and/or the like. The one or more resource nodes may be mapped to the corresponding provider nodes, for example, to identify the first provider 150a and/or the second provider 150b as being the provider of the resources associated with each of the resource nodes. Moreover, the information technology infrastructure controller 110 may generate the dependency graph by at least inserting one or mom edges to interconnect, for example, the resource nodes and the provider nodes. An edge interconnecting a resource node to a provider node may identify the provider associated with the provider node as being a provider of the resource associated with the resource node. Meanwhile, an edge interconnecting two resource nodes may indicate a dependency between the resources associated with the two resource nodes.

To represent resources that require de-provisioning, the dependency graph may include one or more "orphan" resource nodes, which may be disconnected from the provider nodes and other resource nodes in the dependency graph. Alternatively and/or additionally, in order to represent the modification of an existing resource within the information technology infrastructure 130, the information technology infrastructure controller 110 may generate the dependency graph by at least splitting the corresponding resource node into a first resource node and a second resource node. The first resource node may correspond to the existing resource, which may be de-provisioned when the configurations specified in the execution plan 190 are applied to the information technology infrastructure 130. Meanwhile, the second resource node may correspond to the modified resource, which may be provisioned when the configurations specified in the execution plan 190 are applied to the information technology infrastructure 130.

Referring again to FIG. 1B, the policy engine 170 may be configured to validate the execution plan 190 before the information technology infrastructure controller 110 applies the corresponding configurations to the information technology infrastructure 130. As FIG. 1B shows, the policy engine 170 may be configured to validate the execution plan 190 based on one or more policies including, for example, a first policy 175a, a second policy 175b, a third policy (depicted as a "quota" on aggregate resource usage, or similar) 175c, a fourth policy (also as a "quota") 175d, and/or the like. The first policy 175a, the second policy 175b, the third policy 175c, and/or fourth policy 175d, may be configured, for example, by the first user 145a and/or the second user 145b based at least on the first user 145a and/or the second user 145b having the necessary access privileges (e.g., administrative access and/or the like) for setting and/or modifying a policy at the policy engine 170.

The first policy 175a, the second policy 175b, the third policy 175c, and/or fourth policy 175d may impose any requirements with respect to the configurations applied to the information technology infrastructure 130 including, for example, security, running costs, resource allocation and distribution, and/or the like. For example, the first policy 175a, the second policy 175b, and/or the third policy 175c may specify that an X instance type may only be built during a Y period in a Z region. Accordingly, the policy engine 170 may be configured to determine, based at least on the execution plan 190, whether the information technology infrastructure 130 would satisfy the requirements imposed by the first policy 175a, the second policy 175b, and/or the third policy 175c if the configurations associated with the execution plan 190 are applied to the information technology infrastructure 130.

The information technology infrastructure controller 110 may apply, to the information technology infrastructure 130, the configurations associated with the first workspace 165a, the second workspace 165b, and/or the third workspace 165c by at least performing the operations included in the execution plan 190, for example, to provision, modify, and/or de-provision one or more resources at the information technology infrastructure 130. According to some example embodiments, the information technology infrastructure controller 110 may be configured to implement the execution plan 190 based at least on the execution plan 190 having been successfully validated by the policy engine 170. The policy engine 170 may be configured to provide an indication of the execution plan 190 as having been successfully or unsuccessfully validated by the policy engine 170. Alternatively and/or additionally, the policy engine 170 may provide an indication of the execution plan 190 as having passed or failed each of the first policy 175a, the second policy 175b, and the third policy 175c. One or more of the first policy 175a, the second policy 175b, and/or the third policy 175c may be overridden and/or excluded from the validation of the execution plan 190.

In some example embodiments, instead of and/or in addition to the information technology infrastructure controller 110 ingesting, from the version controller 140, the first configuration file 125a and/or the second configuration file 125b before merging the first configuration file 125a and/or the second configuration file 125b into the first workspace 165a, the second workspace 165b, and/or the third workspace 165c to generate the execution plan 190, the first user 145a at the first client 120a and/or the second user 145b at the second client 120b may upload the execution plan 190 directly to the information technology infrastructure controller 110, for example, via an application programming interface (API). Furthermore, the first user 145a at the first client 120a and/or the second user 145b at the second client 120b may remotely execute the execution plan 190, for example, to provision, modify, and/or de-provision resources in the information technology infrastructure 130.

In some example embodiments, the state controller 180 may be configured to track the changes that are applied to the configurations of the information technology infrastructure 130. For example, the state controller 180 may generate and store a state file prior to implementing an execution plan such as, for example, the execution plan 190. The state file may capture a current state at the information technology infrastructure 130, including one or more existing configurations at the information technology infrastructure 130, prior to the application of the configurations associated with the execution plan. The information technology infrastructure controller 110 may determine, based on one or more state files generated and stored by the state controller 180, a previous state of the information technology infrastructure 130 including, for example, one or more previous configurations at the information technology infrastructure 130. Alternatively and/or additionally, the information technology infrastructure controller 110 may restore, based at on the one or more state files generated and stored by the state controller 180, the information technology infrastructure 130 to a previous state.

For instance, as FIG. 1B shows, the state controller 180 may generate and store a plurality of state files including, for example, a first state file 185a, a second state file 185b, and/or the like. The first state file 185a and the second state file 185b may capture successive states of the information technology infrastructure 130. For example, the first state file 185a may capture the configurations at the information technology infrastructure 130 at a first time $t_1$ prior to the implementation of a first execution plan while the second state file 185b may capture the configurations at the information technology infrastructure 130 at a second time $t_2$ prior to the implementation of a second execution plan. The information technology infrastructure controller 110 may determine and/or restore, based at least on the first state file 185a, the information technology infrastructure 130 to a state at the first time $t_1$. Alternatively and/or additionally, the information technology infrastructure controller 110 may determine and/or restore, based at least on the second state file 185b, the information technology infrastructure 130 to a state at the second time $t_2$. It should be appreciated that by restoring the information technology infrastructure 130 to an earlier state, the information technology infrastructure controller 110 may reverse subsequent changes to the configurations of the information technology infrastructure 130.

Referring again to FIG. 1B, the state controller 180 may also maintain a run log 187 tracking, for example, various runs of one or more execution plans including, for example, the execution plan 190. As used herein, "running" the execution plan 190 may include generating the execution plan 190, validating the execution plan 190, applying the configurations associated with the execution plan 190, canceling the execution plan 190, discarding the execution plan 190, and/or the like. Accordingly, each run of an execution plan may be associated with a run status including, for example, planning, planned, error, confirmed, applying, applied, canceled, discarded, pending, policy checking, policy checked, policy override, and/or the like. The run log 187 may be configured to track the runs of one or more execution plan including, for example, by storing a corresponding run status for each of the runs.

In some example embodiments, the state controller 180 may maintain state files and run logs for each individual workspace. For example, the first state file 185a, the second state file 185b, and the run log 187 may be associated with the first workspace 165a while the state controller 180 may maintain additional state files and run logs for the other workspaces including, for example, the second workspace 165b, the third workspace 165c, and/or the like. However, it should be appreciated that the first state file 185a, the second state file 185b, and the run log 187 may be associated with the information technology infrastructure 130 as a whole instead of any individual workspace associated with the information technology infrastructure 130.

Figure 1C:
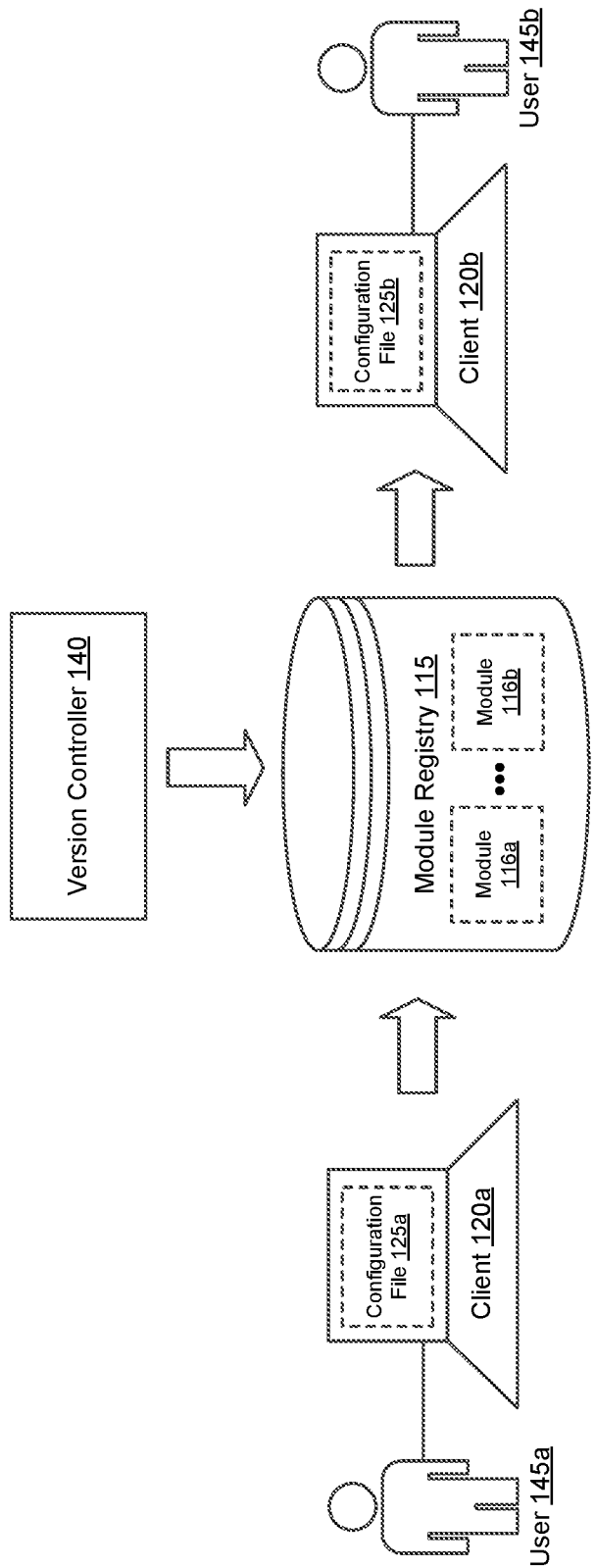
FIG. 1C depicts a block diagram illustrating a module registry, in accordance with some example embodiments.

FIG. 1C depicts a block diagram illustrating a module registry 115, in accordance with some example embodiments. Referring to FIGS. 1A-C, the module registry 115 may include a plurality of infrastructure modules including, for example, a first module 116a, a second module 116b, and/or the like. The first module 116a and the second module 116b may each include the configurations that may be applied to the information technology infrastructure 130 to achieve, at least partially, an information technology objective such as, for example, support for a software application, a multi-tier software application, self-service clusters, software demonstrations, disposable environments (e.g., production environments, staging environments, and/or the like), software defined networking, resource schedulers, multi-cloud deployment, and/or the like.

Referring again to FIG. 1C, the first user 145a may create the first module 116a and/or the second module 116b while creating the first configuration file 125a at the first client 120a. The first user 145a may publish the first module 116a and/or the second module 116b such that the second user 145b may add, to the second configuration file 125b, the first module 116a and/or the second module 116b while the second user 145b is creating the second configuration file 125b at the second client 120b. Adding the first module 116a and/or the second module 116b to the second configuration file 125b may incorporate, into the second configuration file 125b, the configurations included in first module 116a and/or the second module 116b. For example, the first module 116a and/or the second module 116b may include the provisioning, modification, and/or de-provisioning of one or more of the hardware resources 135a, the software resources 135b, and/or the network resources 135c at the information technology infrastructure 130 to support the deployment, testing, and/or maintenance of a software application. Accordingly, adding to the first module 116a and/or the second module 116b to the second configuration file 125b may incorporate, into the second configuration file 125b, the provisioning, modification, and/or de-provisioning of the same resources.

In some example embodiments, the first module 116a and/or the second module 116b may be published directly to the module registry 115 by adding, to the module registry 115, a version of the first module 116a and/or the second module 116b. Alternatively and/or additionally, the first module 116a and/or the second module 116b may be published via the version controller 140. Publishing the first module 116a and/or the second module 116b via the version controller 140 may include registering, at the version controller 140, a webhook (e.g., a hypertext transfer protocol (HTTP) callback) configured to post, to the information technology infrastructure controller 110, a notification whenever a different version of the first module 116a and/or the second module 116b is committed to the version controller 140. Accordingly, instead of storing static versions of the first module 116a and/or the second module 116b, the information technology infrastructure controller 110 may update the module registry 115 whenever, for example, the first user 145a creates another version of the first module 116a and/or the second module 116b. In doing so, the second user 145b may have access to multiple versions of the first module 116a and/or the second module 116b including, for example, the most recent versions of the first module 116a and/or the second module 116b, when creating the second configuration file 125b.

In some example embodiments, the module registry 115 may be associated with the organization 155 such that only users from the organization 155 (e.g., the first user 145a at the first client 120a and/or the second user 145b at the second client 120b) may have access to the module registry 115, for example, to publish modules, consume modules, and/or the like. For example, the first user 145a may publish the first module 116a and/or the second module 116b to the module registry 115 and the second user 145b may consume the first module 116a and/or the second module 116b from the module registry 115 based at least on the first user 145a and the second user 145b being associated with the organization 155. A user who is not associated with the organization 155 may be prevented from accessing the module registry 115. That is, a user who is not associated with the organization 155 may neither publish nor consume an infrastructure module from the module registry 115.

Figure 2:
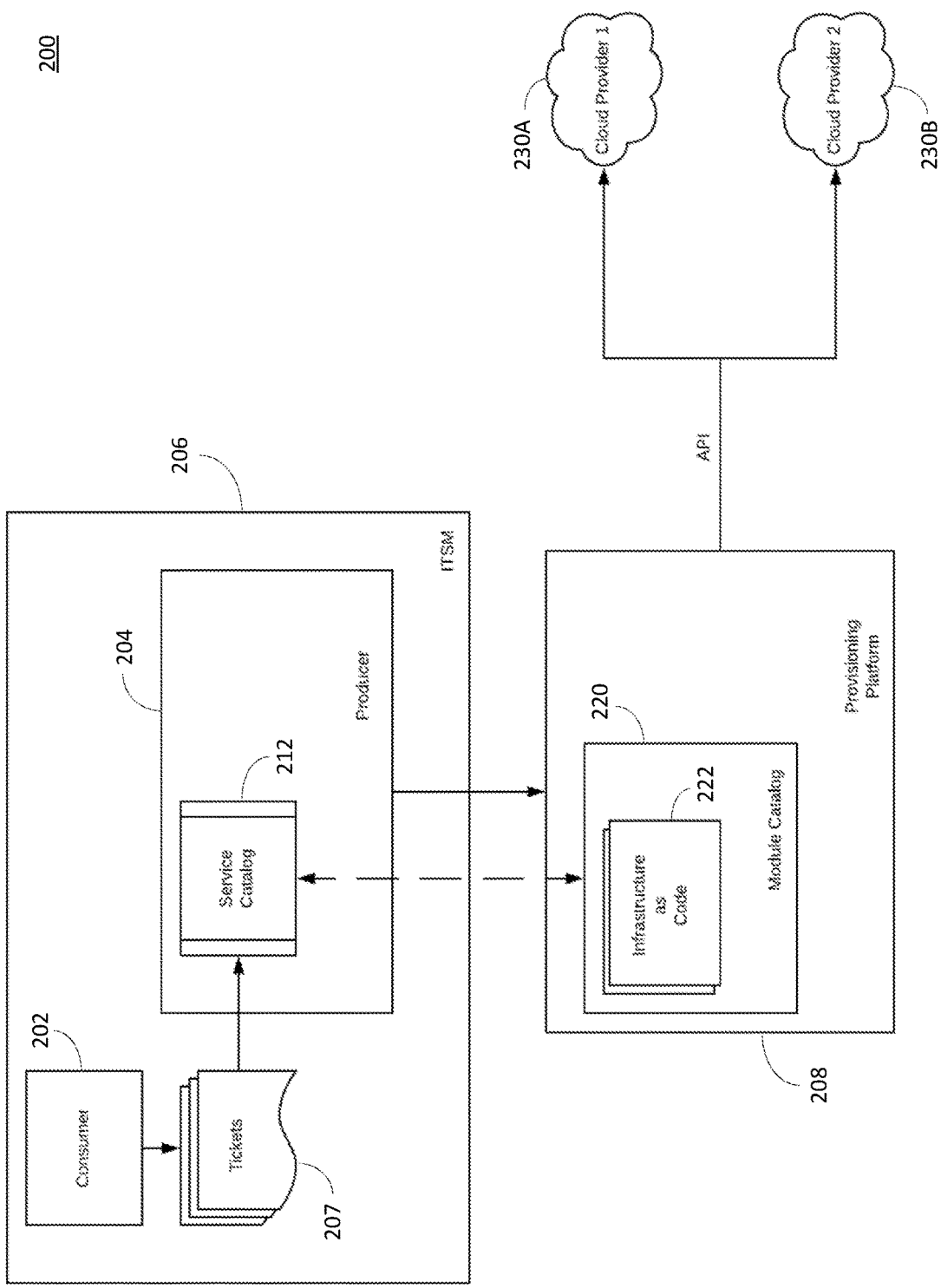
FIG. 2 illustrates a system and method for ticket-based provisioning of cloud infrastructure for an enterprise.

In some implementations consistent with the subject matter described herein, FIG. 2 shows a system 200 having a provisioning platform 208 for provisioning cloud infrastructure for an enterprise, and more particularly cloud infrastructure as requested, defined and produced by an information technology service management (ITSM) 206 associated with the enterprise. For instance, the ITSM 206 can be a group of IT persons in the enterprise, or part of a Software-as-a-Service (SaaS) provider to the enterprise for managing the enterprise's IT needs. The cloud infrastructure can include one or more workspaces defined for running one or more workflows, such as provided by an application, for teams in the enterprise.

The cloud infrastructure provisioned by the provisioning platform 208 and which forms the workspaces can be provided by one or more cloud providers 230A. 230B via an API. Although two cloud providers 230A and 230B are shown, there might be only a single cloud provider, or multiple cloud providers, that provide cloud services according to the cloud infrastructure designed, planned and/or requested by ISTM 206. While cloud providers 230A and/or 230B can be public cloud providers, such as Amazon's AWS® or Microsoft's Azure® web services provider platform, they can also be providers of cloud computing and virtualization software and services, such as provided by VMWARE® or the like. The provisioning platform 208 can also be used to configure networking hardware, or physical devices, as long as they provide an API to interface with, as well as a corresponding provider. Accordingly, the provisioning platform 208 can provision and manage any hardware and software resources necessary for a cloud infrastructure.

The ITSM 206 includes one or more consumers 202 and one or more producers 204. Each consumer 202 and producer 204 can be a person or group of persons. The one or more producers 204 author, using an authoring tool on a computer, Infrastructure as Code (IAC) modules 222, i.e., machine-readable code that drives provisioning of cloud infrastructure by defining cloud infrastructure to create the one or more workspaces and/or workflows, and upload the IACs 222 to a module catalog 220 hosted by the provisioning platform 208. The uploading can be directly from the ITSM 206, or indirectly through a version control system (VCS) repository maintained by the provisioning platform 208.

Based on the IACs 222 stored in the module catalog 220 of the provisioning platform, the ISTM 206 provides a service catalog 212 that includes a number of entries, sometimes called stock-keeping units (SKUs), corresponding with the modules in the module catalog 220. In some implementations, the service catalog 212 maintains a 1:1 mapping back to the module catalog 220. The one or more consumers 202 generate and submit, using a service management application on a computer, one or more requests or "tickets" 207. A ticket 207 is driven based on the service catalog 207, and is not connected to a VCS repository maintained by the ITSM platform 206. Each ticket 207 invokes an instance of an entry or template in the service catalog 212. Each ticket 207 is fulfilled by creating one or more new workspaces, based on that template, and executing it with variables provided from the ticket 207.

As discussed above, a ticket 207 can be based on a template from either an existing workspace or from VCS repository maintained by the provisioning platform 208. Users can define variable values ahead of time for the template to copy, and other variables which are required to be set at workspace creation time. Workspaces created from templates would not automatically have runs queued from new commits in the VCS repository, but a user can manually queue a change across all workspaces utilizing the template.

Similarly to workspace templates, most infrastructure requested from the service catalog 212 is likely to be temporary in nature. Accordingly, an expiration date for a workspace can be defined, so that infrastructure owners would feel more comfortable enabling self-serve infrastructure for their organization and avoid long-term commitments to infrastructure resources. In some implementations, users can request an extension for their infrastructure if needed. Administrators can define initial durations and limits on extensions.

While there is a one-to-one mapping between service catalog entries and IaC modules 222, catalog entries in the service catalog 212 cannot use IaC modules 222 directly. In order for the requested infrastructure entries to be built, via the service catalog 212, an system of processes are executed, called "binding" processes. When an ITSM ticket 207 is created, a snippet from the integration translates the request from the ticket 207 to an API request, and the ITSM 206 routes that API request to the appropriate API endpoints in the provisioning platform 208. The provisioning platform 208 receives the API requests and performs the necessary provisioning steps defined in the Infrastructure as Code modules 222 to fulfill the request. Meanwhile, the integration seeks out and listens for API responses that indicate the request is complete. When the provisioning steps are completed, the provisioning platform 208 issues an API response indicating the status and final form of the provisioning. The integration receives this response and updates the ITSM ticket with the information.

Accordingly, when a ticket 207 request is submitted, the ITSM platform 206 is pre-configured to bind an entry in the service catalog 212 to a corresponding IaC module 222 in the module catalog 220. That module is backed by infrastructure as code, which describes the infrastructure to be provisioned. The ITSM system 206 triggers an action in the provisioning platform 208, such that the infrastructure corresponding to the ticket 207 is instantiated on one or more cloud providers 230A and 230B. The provisioning process in 208 will go through the steps outlined in 110, including planning, generation of an execution plan, validation, and possibly requiring external approvals.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system for ticket-based provisioning of cloud infrastructure from one or more cloud providers to build one or more computing workspaces of an enterprise, the system comprising:
   a processor;
   a module catalog having one or more infrastructure-as-code (IAC) modules, each of the one or more IAC modules including code that is executable by the processor to provision cloud computing resources for the cloud infrastructure from the one or more cloud providers to build at least part of the one or more computing workspace of the enterprise; and
   a service catalog having one or more electronic entries mapped to one or more IAC modules of the module catalog, the service catalog being configured to receive one or more tickets that each specify at least one of the one or more ecteronic entries in the service catalog, and to bind the specified at least one electronic entry with a corresponding at least one of the one or more IAC modules in the module catalog, the binding instantiating the computing resources for the cloud infrastructure corresponding to the ticket on the one or more cloud providers,
   wherein the service catalog is further configured such that, upon receipt of a ticket specifying at least one electronic entry, the system automatically and programmatically initiates, without requiring further user input, an application programming interface (API) call to execute an IAC module corresponding to the specified electronic entry, thereby provisioning the corresponding cloud computing resources on the one or more cloud providers, and wherein the system is further configured to update the status of the ticket in the service catalog to reflect the result of the execution of the IAC module, including whether the provisioning was successful or encountered an error.

2. A system for ticket-based provisioning of cloud infrastructure from one or more cloud providers to build one or more computing workspaces of an enterprise, the system comprising:
   a processor;
   a module catalog having one or more infrastructure-as-code (IAC) modules, each of the one or more IAC modules including code that is executable by the processor to provision cloud computing resources for the cloud infrastructure from the one or more cloud providers to build at least part of the one or more computing workspaces of the enterprise; and
   a service catalog having one or more electronic entries mapped to one or more IAC modules of the module catalog, the service catalog being configured to receive one or more tickets that each specify at least one of the one or more electronic entries in the service catalog, and to bind the specified at least one electronic entry with a corresponding at least one of the one or more IAC modules in the module catalog, the comprising injecting variable values parsed from the ticket into placeholders of a version-controlled IAC module before execution, and instantiating the computing resources for the cloud infrastructure corresponding to the ticket on the one or more cloud providers.

3. A system for ticket-based provisioning of cloud infrastructure from one or more cloud providers to build one or more computing workspaces of an enterprise, the system comprising:
   a processor;
   a module catalog having one or more infrastructure-as-code (IAC) modules, each of the one or more IAC modules including code that is executable by the processor to provision cloud computing resources for the cloud infrastructure from the one or more cloud providers to build at least part of the one or more computing workspace of the enterprise; and
   a service catalog having one or more electronic entries mapped to one or more IAC modules of the module catalog, the service catalog being configured to receive one or more tickets that each specify at least one of the one or more ecteronic entries in the service catalog, and to bind the specified at least one electronic entry with a corresponding at least one of the one or more IAC modules in the module catalog, the binding instantiating the computing resources for the cloud infrastructure corresponding to the ticket on the one or more cloud providers,
   wherein each ticket includes a mandatory expiration-date field specifying an expiration time for the corresponding computing workspace, and the system is further configured to, upon reaching the expiration time, automatically de-provision the computing resources instantiated for the workspace in accordance with the ticket, without further user input.

* * * * *